US008687618B2

(12) United States Patent
Mella et al.

(10) Patent No.: US 8,687,618 B2
(45) Date of Patent: Apr. 1, 2014

(54) SYSTEM AND METHOD WHICH ALLOW BASE STATION CONTROL OF USER EQUIPMENT TRANSMISSION

(75) Inventors: Perttu Mella, Lepsämä (FI); Jyri Karhu, Vantaa (FI)

(73) Assignee: Nokia Corporation, Espoo (FI)

( * ) Notice: Subject to any disclaimer, the term of this patent is extended or adjusted under 35 U.S.C. 154(b) by 884 days.

(21) Appl. No.: 11/402,996

(22) Filed: Apr. 13, 2006

(65) Prior Publication Data

US 2006/0250996 A1 Nov. 9, 2006

(30) Foreign Application Priority Data

Apr. 28, 2005 (EP) ..................................... 05009358

(51) Int. Cl.
*H04J 3/24* (2006.01)
(52) U.S. Cl.
USPC ........... 370/349; 370/335; 370/461; 370/329; 370/328; 455/418; 455/419; 455/420; 455/403; 455/424; 455/561; 455/550.1
(58) Field of Classification Search
USPC ............... 455/434, 450, 522, 34, 500, 70, 91, 455/103, 418–420, 403, 424, 436, 561, 455/550.1, 556.2; 370/278, 335, 347, 348, 370/349, 433, 473, 493, 461, 329, 328
See application file for complete search history.

(56) References Cited

U.S. PATENT DOCUMENTS

| | | | | |
|---|---|---|---|---|
| 5,559,503 | A * | 9/1996 | Blahut | 340/825.52 |
| 5,799,251 | A * | 8/1998 | Paavonen | 455/517 |
| 7,076,262 | B1 * | 7/2006 | Bhatoolaul et al. | 455/522 |
| 2001/0008524 | A1 * | 7/2001 | Ishii et al. | 370/335 |
| 2001/0026543 | A1 * | 10/2001 | Hwang et al. | 370/335 |
| 2001/0026547 | A1 * | 10/2001 | Moulsley et al. | 370/347 |
| 2002/0093928 | A1 * | 7/2002 | LoGalbo et al. | 370/336 |
| 2003/0026219 | A1 * | 2/2003 | Moon et al. | 370/318 |
| 2003/0096631 | A1 * | 5/2003 | Kayama et al. | 455/522 |
| 2004/0077357 | A1 * | 4/2004 | Nakada | 455/452.1 |
| 2005/0047366 | A1 * | 3/2005 | Ghosh et al. | 370/329 |
| 2005/0111480 | A1 * | 5/2005 | Martin | 370/461 |

FOREIGN PATENT DOCUMENTS

| | | |
|---|---|---|
| WO | WO 00/56107 | 9/2000 |
| WO | WO 01/74107 | 10/2001 |
| WO | WO 03/003643 | 1/2003 |

OTHER PUBLICATIONS

Vietnam Office Action in Vietnamese Application No. 1-2007-02508, dated Apr. 6, 2012.
Malaysian Office Action dated Sep. 28, 2012 in Malaysian Patent Application No. PI 20061895, 3 pages.
Taiwanese Office Action dated Dec. 24, 2013, issued in corresponding Taiwanese Application No. 95115015.
Philippine Office Action in Philippine Application No. 12007502404 dated Jul. 18, 2012.

\* cited by examiner

*Primary Examiner* — Manpreet Matharu
(74) *Attorney, Agent, or Firm* — Squire Sanders (US) LLP

(57) ABSTRACT

A signal is transmitted in a communication network system, in particular a mobile communication network system, from a user equipment, in particular a mobile user equipment, to a base station, which signal includes an information about the kind of a message intended to be transmitted from said user equipment to said base station, wherein said information must be acknowledged by said base station as a condition for transmitting said message from said user equipment to said base station.

34 Claims, 1 Drawing Sheet

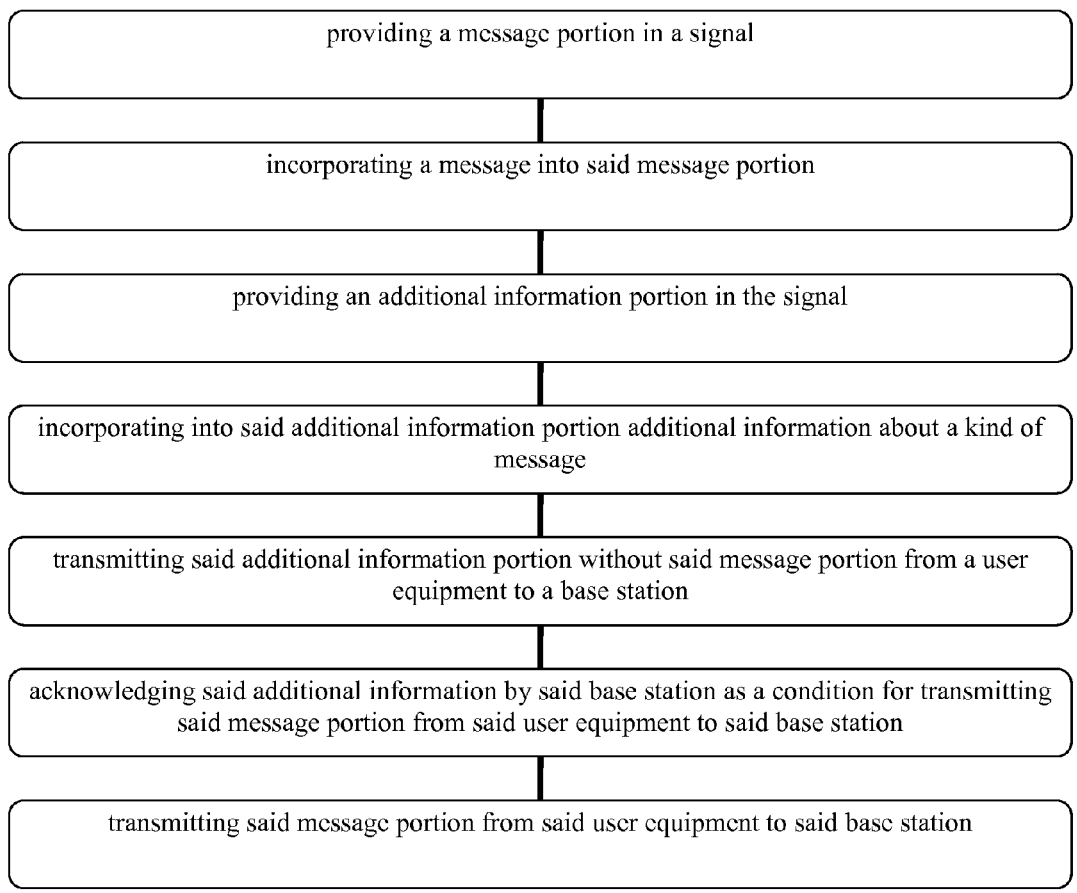

SYSTEM AND METHOD WHICH ALLOW BASE STATION CONTROL OF USER EQUIPMENT TRANSMISSION

FIELD OF THE INVENTION

The present invention relates to a signal to be transmitted in a communication network system, in particular a mobile communication network system, from a user equipment, in particular a mobile user equipment, to a base station. Further, the present invention relates to a user equipment which is adapted to produce such a signal, as well as to a communication network system comprising at least a base station and at least such a user equipment. Finally, the present invention relates to a method for processing a signal to be transmitted in a communication network system, in particular a mobile communication network system, from a user equipment, in particular a mobile user equipment, to a base station.

BACKGROUND OF THE INVENTION

In mobile communication network systems, in particular of a WCDMA (wideband code division multiple access) type, dedicated channels are allocated only in a radio resource control state, and there are own dedicated channel types for signalling and user data transmission. Common channels are used instead of dedicated channels when common channels are more suitable in this phase of the call or when the data amount to be transmitted is small or when there is congestion so that the dedicated signalling and/or user data channel cannot be allocated. So, in this phase of the call a message comprising signalling and/or user data shall be transmitted via the same individual common channels of a cell. However, when a user equipment, which usually is a mobile telephone device, requests grant to use such a common channel for accessing the network or signalling with the network or for transmission of user data, the base station is not able to judge the message when making an acquisition decision of whether or not to grant the user equipment to use such a common channel for transmitting the message.

SUMMARY OF THE INVENTION

An object of the present invention is to provide a signal which allows the base station to make an acquisition decision.

In order to achieve the above and further objects, in accordance with a first aspect of the present invention, there is provided a signal to be transmitted in a communication network system, in particular a mobile communication network system, from a user equipment, in particular a mobile user equipment, to a base station, characterized by including an information about the kind of a message intended to be transmitted from said user equipment to said base station which information is provided to be acknowledged by said base station as a condition for transmitting said message from said user equipment to said base station.

In accordance with a second aspect of the present invention, there is provided a signal to be transmitted in a communication network system, in particular a mobile communication network system, from a user equipment, in particular a mobile user equipment, to a base station, comprising at least a message portion including a message, characterized by at least an additional information portion including additional information about the kind of the message, wherein said information portion is provided to be transmitted without said message portion in a first step and to be acknowledged by said base station as a condition for transmitting said message portion from said user equipment to said base station in a second step.

In accordance with a third aspect of the present invention, there is provided a user equipment which is adapted to produce a signal according to the above mentioned first or second aspect of the present invention.

In accordance with a fourth aspect of the present invention, there is provided communication network system, in particular a mobile communication network system, comprising at least a base station and at least a user equipment, in particular a mobile user equipment, according to the third aspect of the present invention.

In accordance with a fifth aspect of the present invention, there is provided a method for processing a signal to be transmitted in a communication network system, in particular a mobile communication network system, from a user equipment, in particular a mobile user equipment, to a base station, characterized by the steps of incorporating an information about the kind of a message intended to be transmitted from said user equipment to said base station, transmitting the signal including said information from said user equipment to said base station, and acknowledging said information by said base station as a condition for transmitting said message from said user equipment to said base station.

In accordance with a sixth aspect of the present invention, there is provided a method for processing a signal to be transmitted in a communication network system, in particular a mobile communication network system, from a user equipment, in particular a mobile user equipment, to a base station, comprising the steps of providing a message portion in the signal, and incorporating a message into said message portion, characterized by the further steps of providing an additional information portion in the signal, incorporating into said additional information portion additional information about the kind of the message, transmitting said information portion without said message portion from said user equipment to said base station, acknowledging said information by said base station as a condition for transmitting said message portion from said user equipment to said base station, and transmitting said message portion from said user equipment to said base station.

Accordingly, the present invention provides an additional information about the kind of a message intended to be transmitted from the user equipment to the base station. This new additional information is transmitted from the user equipment to the base station without the message, i.e. before a transmission of the message, and needs to be acknowledged before the message will be transmitted from the user equipment to the base station. Namely, according to the present invention, the acknowledgement of this additional information by the base station is required as a condition for a subsequent transmission of the message from the user equipment to the base station. So, the base station is in a position to judge the expected message when making acquisition decisions. For a better identification, the additional information may be different depending on which kind the message to be transmitted is going to have.

Preferably, the information is provided to cause the base station to make a decision at which time the message be transmitted from the user equipment to the base station.

An advantageous use of the present invention is to transmit the signal via a common channel of a cell of the communication network system.

In a further preferred embodiment of the present invention, the information gives a predetermined level of priority for transmitting the message and in case of a higher level of priority the information causes the base station to allow the message to be transmitted from the user equipment to the base station at an earlier time than in case of a lower level of priority. So, the more important messages can be transmitted at an earlier stage or even immediately, whereas messages of lower importance can be transmitted later when there is sufficient capacity to transmit such messages as well. An advantage of this embodiment is that a message of higher importance can be prioritised over another message of lower importance to get through. This even applies to a message including an emergency call which usually has the highest priority. For example, in a WCDMA communication network system the signal is part of a random access channel pre-ample signal or consists of such a signal to be transmitted from the user equipment to the base station in a random access procedure wherein the user equipment requests grant to use a random access channel (1.) for accessing the network or signalling with the network by higher layer control signalling including in the message for forming the message and having a higher level of priority and/or (2.) for transmitting non real time user data including in the message for forming the message and having a lower level of priority. So, the additional information which is transmitted in advance tells to the base station whether the user equipments aims to use the random access channel for higher layer control signalling or for transmission of non real time user data. If the user equipment aims to use the random access channel for both, i.e. higher layer control signalling and non real time user data transmission, it reports "higher layer control signalling" since it has higher priority. By using this information, the base station can schedule grants to use the random access channel first by user equipments which aim to use the random access channel for higher layer control signalling. Grants to use the random access channel for non real time user data is given by the base station only if there is free capacity therefor.

Preferably, the information is provided to be acknowledged by the base station in a high load situation or in a congestion situation as a condition for transmitting the message from the user equipment to the base station. Namely, the use of the present invention is particularly advantageous in a high load situation or in a congestion situation where the capacity of the channel(s) used by the base station is limited. So, in particular a message of lower importance does not cause congestion for a message which is more or even most important to get through.

If needed space is available in the signal, the information can comprise further information about the used service so as to allow the base station to even more efficiently schedule a request received from the user equipment.

The above described objects and other aspects of the present invention will be better understood by the following description of a preferred embodiment.

BRIEF DESCRIPTION OF THE FIGURE

FIG. 1 illustrates a method according to certain embodiments of the present invention.

DESCRIPTION OF THE PREFERRED EMBODIMENT

In a WCDMA communication network system, when a user equipment is in the RRC (radio resource control) state "CELL_FACH" both higher level control signalling and non real time user data shall be transmitted via the same individual common channels of the cell. These common channels are a RACH (random access channel) in uplink and a FACH (forward access channel) in downlink direction. Dedicated channels (DCH) are allocated in the RRC state "CELL_DCH" only, and there are own DCH types for signalling and user data transmission. Common channels are used instead of dedicated channels when common channels are more suitable in this phase of a call or when the data amount to be transmitted is small or when there is congestion so that dedicated signalling and/or user data channels cannot be allocated.

A problem occurs when there is high load or congestion in an uplink common channel (RACH) and grant to use RACH is given by the node B (base station) for the RRC connection which uses the RACH for non real time user data transmission, and therefore other RRC connections which might need the RACH for higher layer control signalling face congestion. Higher layer control signalling is more important to be transmitted than non real time user data which can be transmitted later when there is free capacity for transmission.

An additional information is incorporated into the RACH pre-ample signal which is transmitted from the user equipment to the node B in a so called random access procedure. In such a procedure, the user equipment requests grant to use the RACH for higher layer control signalling or for transmission of non real time user data. If the user equipment aims to use the RACH for both, i.e. higher layer control signalling and non real time user data transmission, it reports "higher layer control signalling" since it has higher priority. By using this information, in a high load situation or in a congestion situation node B can schedule grants to use the RACH first to user equipments which aim to use the RACH for higher layer control signalling, whereas grants to use the RACH for non real time user data are given only if there is free capacity for that. Node B transmits the grants to use the RACH to the user equipments via an acquisition indication channel (AICH).

So, the additional information indicates within a predetermined RACH portion something on the intended content of the RACH message portion that the node B can consider when making acquisition decisions. The portion including the additional information is transmitted in a first step without the RACH message portion and needs to be acknowledged by the node B before the message portion will be transmitted. Usually, the additional information is different depending on what kind of message the RACH message portion (which is a data frame) is going to contain. In this example, the message portion includes the above mentioned higher layer control signalling and/or non real time user data.

If enough space is available in the RACH pre-ample procedure, the user equipment may also give more precise information about the used service to allow even more efficient scheduling of the requests received in the node B. Furthermore, the scheduling functionality in the node B may be controlled from a radio network controller (RNC) via a node B application part (NBAP) or a frame protocol (FP) by signalling the needed parameters and algorithms. The node B can utilise an existing RACH load measurement (3GPP TS 25.215).

So, an advantage of the above described preferred embodiment is that higher layer control signalling can be prioritised over non real time user data in the RACH. Therefore transmission of non real time user data in the RACH does not cause congestion for higher layer control signalling which is most important to get through. This even applies to higher layer control signalling to setup an emergency call.

Although the invention is described above with reference to a preferred example, it is apparent that the invention is not restricted to it, but can vary in many ways within the scope disclosed in the attached claims. So, for example, the invention can be used for anything on which the network is supposed to do with the additional information.

The invention claimed is:

1. An apparatus, comprising:
at least one processor; and
at least one memory including computer program code,
wherein the at least one memory and the computer program code are configured to, with the at least one processor, cause the apparatus at least to perform
initiate the production of a signal to be transmitted in a communication network system from a user equipment to a base station,
wherein the signal comprises an information about a kind of a message intended to be transmitted from said user equipment to said base station,
wherein the information is provided to be acknowledged by said base station as a condition for transmitting said message from said user equipment to said base station, and
wherein the kind of the message comprises at least one of higher layer control signaling or non real time user data.

2. A system, comprising:
a base station;
a user equipment;
transmission means for transmitting a signal from the user equipment to the base station,
wherein the signal comprises an information about a kind of a message intended to be transmitted from said user equipment to said base station,
wherein the information is provided to be acknowledged by said base station as a condition for transmitting said message from said user equipment to said base station, and
wherein the kind of the message comprises at least one of higher layer control signaling or non real time user data.

3. A method, comprising:
incorporating, into a signal, an information about a kind of a message intended to be transmitted from a user equipment to a base station;
transmitting the signal including said information from said user equipment to said base station; and
receiving an acknowledgment of said information by said base station, the receipt of the acknowledgment configured to serve as a condition for transmitting said message from said user equipment to said base station in a communication system, and
wherein the kind of the message comprises at least one of higher layer control signaling or non real time user data.

4. The method according to claim 3, wherein said information is configured to cause said base station to make a decision at a time when said message is to be transmitted from said user equipment to said base station.

5. The method according to claim 3, wherein the signal is transmitted via a common channel of a cell of the communication network system.

6. The method according to claim 3, wherein said information indicates a predetermined level of priority for transmitting said message, and in case of a higher level of priority, said information is configured to cause said base station to allow said message to be transmitted from said user equipment to said base station at an earlier time than in case of a lower level of priority.

7. The method according to claim 6, further comprising:
transmitting the signal in a wideband code division multiple access communication network system, wherein the signal is at least part of a random access channel pre-ample signal to be transmitted from said user equipment to said base station in a random access procedure and wherein said user equipment requests a grant to use a random access channel for at least one of
accessing the communication network system or signaling with the communication network system by higher layer control signalling included in said message, said higher layer control signaling having a higher level of priority, or
transmitting non real time user data included in said message, said non real time data having a lower level of priority.

8. The method according to claim 3, wherein in a high load situation or in a congestion situation said information is acknowledged by said base station as a condition for transmitting said message from said user equipment to said base station.

9. The method according to claim 3, wherein said information comprises further information about a used service.

10. A method, comprising:
providing a message portion in a signal;
incorporating a message into said message portion;
providing an additional information portion in the signal;
incorporating into said additional information portion additional information about a kind of the message;
transmitting said additional information portion without said message portion from a user equipment to a base station;
receiving an acknowledgment of said additional information from said base station, wherein receipt of the acknowledgement is configured to serve as a condition for transmitting said message portion from said user equipment to said base station; and
transmitting said message portion from said user equipment to said base station,
wherein the kind of the message comprises at least one of higher layer control signaling or non real time user data.

11. The method according to claim 10, wherein said information is configured to cause said base station to make a decision at a time when said message is to be transmitted from said user equipment to said base station.

12. The method according to claim 10, wherein the signal is transmitted via a common channel of a cell of the communication network system.

13. The method according to claim 10, wherein said information gives a predetermined level of priority for transmitting said message, and in case of a higher level of priority, said information causes said base station to allow said message to be transmitted from said user equipment to said base station at an earlier time than in case of a lower level of priority.

14. The method according to claim 13, comprising transmitting the signal in a wideband code division multiple access communication network system, wherein the signal is at least part of a random access channel pre-ample signal to be transmitted from said user equipment to said base station in a random access procedure and wherein said user equipment requests a grant to use a random access channel for at least one of
accessing the communication network system or signaling with the communication network system by higher layer control signalling included in said message, said higher layer control signaling having a higher level of priority, or
transmitting non real time user data included in said message, said non real time data having a lower level of priority.

15. The method according to claim 10, wherein in a high load situation or in a congestion situation said information is acknowledged by said base station as a condition for transmitting said message from said user equipment to said base station.

16. The method according to claim 10, wherein said information comprises further information about a used service.

17. An apparatus, comprising:
at least one processor; and
at least one memory including computer program code,
wherein the at least one memory and the computer program code are configured to, with the at least one processor, cause the apparatus at least to perform
incorporate, into a signal, an information about a kind of a message intended to be transmitted from a user equipment to a base station,
initiate transmission of the signal including said information from said user equipment to said base station, and
receive an acknowledgment of said information by said base station, the receipt of the acknowledgment configured to serve as a condition for transmitting said message from said user equipment to said base station,
wherein the kind of the message comprises at least one of higher layer control signaling or non real time user data.

18. The apparatus according to claim 17, wherein said information is configured to cause said base station to make a decision at a time when said message is to be transmitted from said user equipment to said base station.

19. The apparatus according to claim 17, wherein the processor is configured to initiate transmission of the signal via a common channel of a cell of the communication network system.

20. The apparatus according to claim 17, wherein said information indicates a predetermined level of priority for transmitting said message, and in case of a higher level of priority, said information is configured to cause said base station to allow said message to be transmitted from said user equipment to said base station at an earlier time than in case of a lower level of priority.

21. The apparatus according to claim 20, wherein the processor is configured to initiate transmission of the signal in a wideband code division multiple access communication network system, wherein the signal is at least part of a random access channel pre-ample signal to be transmitted from said user equipment to said base station in a random access procedure and wherein said user equipment requests a grant to use a random access channel for at least one of
accessing the communication network system or signaling with the communication network system by higher layer control signalling included in said message, said higher layer control signaling having a higher level of priority, or
transmitting non real time user data included in said message, said non real time data having a lower level of priority.

22. The apparatus according to claim 17, wherein in a high load situation or in a congestion situation said information is acknowledged by said base station as a condition for transmitting said message from said user equipment to said base station.

23. The apparatus according to claim 17, wherein said information comprises further information about a used service.

24. An apparatus, comprising:
at least one processor; and
at least one memory including computer program code,
wherein the at least one memory and the computer program code are configured to, with the at least one processor, cause the apparatus at least to perform
provide a message portion in a signal,
incorporate a message into said message portion,
provide an additional information portion in the signal,
incorporate into said additional information portion additional information about a kind of the message,
initiate transmission of said additional information portion without said message portion from a user equipment to a base station,
receive an acknowledgment of said additional information from said base station, wherein receipt of the acknowledgement is configured to serve as a condition for transmitting said message portion from said user equipment to said base station, and
transmit said message portion from said user equipment to said base station,
wherein the kind of the message comprises at least one of higher layer control signaling or non real time user data.

25. The apparatus according to claim 24, wherein said information is configured to cause said base station to make a decision at a time when said message is to be transmitted from said user equipment to said base station.

26. The apparatus according to claim 24, wherein the controller is configured to initiate transmission of the signal via a common channel of a cell of the communication network system.

27. The apparatus according to claim 24, wherein said information gives a predetermined level of priority for transmitting said message, and in case of a higher level of priority, said information is configured to cause said base station to allow said message to be transmitted from said user equipment to said base station at an earlier time than in case of a lower level of priority.

28. The apparatus according to claim 27, wherein said controller is configured to initiate transmission of the signal in a wideband code division multiple access communication network system, wherein the signal is at least part of a random access channel pre-ample signal to be transmitted from said user equipment to said base station in a random access procedure and wherein said user equipment is configured to request a grant to use a random access channel for at least one of
accessing the communication network system or signaling with the communication network system by higher layer control signalling included in said message, said higher layer control signaling having a higher level of priority, or
transmitting non real time user data included in said message, said non real time data having a lower level of priority.

29. The apparatus according to claim 24, wherein in a high load situation or in a congestion situation said information is acknowledged by said base station as a condition for transmitting said message from said user equipment to said base station.

30. The apparatus according to claim 24, wherein said information comprises further information about a used service.

31. An apparatus, comprising:
message preparation means for incorporating, into a signal, an information about a kind of a message intended to be transmitted from a user equipment to a base station;
transmission means for transmitting the signal including said information from said user equipment to said base station; and
reception means for receiving an acknowledgment of said information by said base station, the receipt of the acknowledgment configured to serve as a condition for transmitting said message from said user equipment to said base station in a communication system, wherein the kind of the message comprises at least one of higher layer control signaling or non real time user data.

32. An apparatus, comprising:

message portion providing means for providing a message portion in the signal;

message incorporation means for incorporating a message into said message portion;

additional information portion providing means for providing an additional information portion in the signal;

additional information incorporation means for incorporating into said additional information portion additional information about a kind of the message;

additional information transmitting means for transmitting said additional information portion without said message portion from a user equipment to a base station;

receiving means for receiving an acknowledgment of said additional information from said base station, wherein receipt of the acknowledgement is configured to serve as a condition for transmitting said message portion from said user equipment to said base station; and message transmitting means for transmitting said message portion from said user equipment to said base station, wherein the kind of the message comprises at least one of higher layer control signaling or non real time data.

33. A non-transitory computer-readable storage medium encoded with instructions configured to cause a processor to perform a process, the process comprising:

incorporating, into a signal, an information about a kind of a message intended to be transmitted from a user equipment to a base station;

transmitting the signal including said information from said user equipment to said base station; and receiving an acknowledgment of said information by said base station, the receipt of the acknowledgment configured to serve as a condition for transmitting said message from said user equipment to said base station in a communication system, wherein the kind of the message comprises at least one of higher layer control signaling or non real time user data.

34. A non-transitory computer-readable storage medium encoded with instructions configured to cause a processor to perform a process, the process comprising:

providing a message portion in the signal;

incorporating a message into said message portion;

providing an additional information portion in the signal;

incorporating into said additional information portion additional information about a kind of the message;

transmitting said additional information portion without said message portion from a user equipment to a base station;

receiving an acknowledgment of said additional information from said base station, wherein receipt of the acknowledgement is configured to serve as a condition for transmitting said message portion from said user equipment to said base station; and transmitting said message portion from said user equipment to said base station, wherein the kind of the message comprises at least one of higher layer control signaling or non real time user data.

\* \* \* \* \*